United States Patent
Lei et al.

(10) Patent No.: US 12,079,215 B2
(45) Date of Patent: Sep. 3, 2024

(54) QUERY REWRITING METHOD AND APPARATUS, DEVICE AND STORAGE MEDIUM

(71) Applicant: BEIJING BAIDU NETCOM SCIENCE AND TECHNOLOGY CO., LTD., Beijing (CN)

(72) Inventors: Jinyi Lei, Beijing (CN); Shiqiang Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/428,384

(22) PCT Filed: Nov. 13, 2020

(86) PCT No.: PCT/CN2020/128554
§ 371 (c)(1),
(2) Date: Aug. 4, 2021

(87) PCT Pub. No.: WO2022/000934
PCT Pub. Date: Jan. 6, 2022

(65) Prior Publication Data
US 2023/0123581 A1 Apr. 20, 2023

(30) Foreign Application Priority Data
Jun. 28, 2020 (CN) .......................... 202010600669.X (51) Int. Cl.
*G06F 16/245* (2019.01)
*G06F 16/2453* (2019.01)
(52) U.S. Cl.
CPC .............................. *G06F 16/24542* (2019.01)
(58) Field of Classification Search
None
See application file for complete search history.

(56) References Cited

U.S. PATENT DOCUMENTS 8,055,669 B1 11/2011 Singhal et al.
8,375,048 B1 * 2/2013 Wad .................... G06F 16/3338
707/767

(Continued)

FOREIGN PATENT DOCUMENTS

CN  108227955 A   6/2018
CN  109635197 A   4/2019

(Continued)

OTHER PUBLICATIONS

The Extended European Search Report dated Sep. 6, 2022, for Application No. 20913071.5 (nine (9) pages).

(Continued)

*Primary Examiner* — Augustine K. Obisesan
(74) *Attorney, Agent, or Firm* — KDW Firm PLLC (57) ABSTRACT

Provided are a query rewriting method and apparatus, a device and a storage medium, relating to the technical field of data processing and, in particular, to technical fields including artificial intelligence, speech technology, intelligent search and deep learning. The solution includes, in response to a query rewriting request, extracting at least one of context information of an original query and intention information of the original query; and determining a new query based on a machine vocabulary collection and the at least one of the context information and the intention information. The understanding degree to the new query by a machine is greater than the understanding degree to the original query by the machine.

15 Claims, 7 Drawing Sheets

(56) References Cited

U.S. PATENT DOCUMENTS

| | | | |
|---|---|---|---|
| 11,580,145 B1* | 2/2023 | Kumar | G06N 3/092 |
| 2007/0038621 A1* | 2/2007 | Weyand | G06F 16/3338 |
| | | | 707/999.005 |
| 2009/0106224 A1* | 4/2009 | Roulland | G06F 16/3325 |
| | | | 707/999.005 |
| 2009/0198672 A1* | 8/2009 | Jones | G06F 16/3338 |
| | | | 707/999.005 |
| 2010/0094835 A1* | 4/2010 | Lu | G06F 16/951 |
| | | | 707/E17.143 |
| 2011/0314001 A1* | 12/2011 | Jacobs | G06F 16/951 |
| | | | 707/E17.014 |
| 2013/0211825 A1* | 8/2013 | Tseng | G06F 40/242 |
| | | | 704/10 |
| 2013/0282682 A1* | 10/2013 | Batraski | G06F 16/951 |
| | | | 707/706 |
| 2014/0025664 A1* | 1/2014 | Ahari | G06F 7/00 |
| | | | 707/722 |
| 2014/0040245 A1* | 2/2014 | Rubinstein | G06F 16/40 |
| | | | 707/769 |
| 2014/0108304 A1 | 4/2014 | Heidasch | |
| 2017/0091814 A1* | 3/2017 | Liu | G06Q 30/0269 |
| 2018/0143978 A1* | 5/2018 | Chang | G06F 16/243 |
| 2021/0192134 A1* | 6/2021 | Yue | G06F 16/3326 |

FOREIGN PATENT DOCUMENTS

| | | | |
|---|---|---|---|
| CN | 110727785 A | | 1/2020 |
| CN | 110750616 A | | 2/2020 |
| CN | 110969024 A | | 4/2020 |
| CN | 110990578 A | * | 4/2020 |
| CN | 111797216 A | | 10/2020 |
| JP | 2018116728 A | | 7/2018 |
| TW | 201947428 A | * | 12/2019 |
| WO | 9749045 A1 | | 12/1997 |
| WO | 2019235103 A1 | | 12/2019 |

OTHER PUBLICATIONS

Notice of Reasons for Refusal dated Oct. 27, 2022, for Japanese Patent Application No. 2021-545777 (12 pages).

Grbovic et al., "Context- and Content-aware Embeddings for Query Rewriting in Sponsored Search", SIGIR '15: Proceedings of the 38th International ACM SIGIR Conference on Research and Development in Information Retrieval Aug. 9, 2015, pp. 383-392. https://doi.org/10.1145/2766462.2767709.

Mandal et al., "Query Rewriting using Automatic Synonym Extraction for E-commerce Search", Proceedings of the SIGIR 2019 Workshop on eCommerce, co-located with the 42st International ACM SIGIR Conference on Research and Development in Information Retrieval, eCom@SIGIR 2019, Paris, France, Jul. 25, 2019.

Zhao et al., "A Dynamic Product-aware Learning Model for E-commerce Query Intent Understanding", CIKM '19: Proceedings of the 28th ACM International Conference on Information and Knowledge Management Nov. 2019 pp. 1843-1852. https://doi.org/10.1145/3357384.3358055.

International Search Report for the International Patent Application No. PCT/CN2020/128554, mailed Mar. 29, 2021, 5 pages.

Chinese Search Report for Application No. 202010600669 dated Jul. 21, 2023.

Chinese Office Action for Application No. 202010600669 dated Jul. 23, 2023.

* cited by examiner

QUERY REWRITING METHOD AND APPARATUS, DEVICE AND STORAGE MEDIUM

CROSS-REFERENCE TO RELATED APPLICATIONS

This application is a U.S. National Stage Application of PCT Application Serial No. PCT/CN2020/128554, filed Nov. 13, 2020, which claims priority to Chinese Patent Application No. CN202010600669.X filed Jun. 28, 2020, the disclosures of which are incorporated herein by reference in their entireties.

TECHNICAL FIELD

The present application relates to the technical field of data processing and, in particular, to technical fields including artificial intelligence, speech technology, intelligent search and deep learning. Specifically, embodiments of the present application provide a query rewriting method and apparatus, a device and a storage medium.

BACKGROUND

It is well known that speech queries are much diversified due to a wide variety of oral expressions of users. As a result, a large number of speech queries cannot be understood and satisfied. At present, most map-type speech assistant products return a default reply or a reply configured by rule (for example, "sorry but I didn't catch on") when encountering such a situation. Such a reply gives a user a feel that the product is rather stiff and not smart enough and even interrupts the user's current interaction, causing the user experience to deteriorate.

SUMMARY

The present disclosure provides a query rewriting method and apparatus, a device and a storage medium.

According to one aspect of the present disclosure, a query rewriting method is provided. The method includes, in response to a query rewriting request, extracting at least one of context information of an original query and intention information of the original query; and determining a new query based on a machine vocabulary collection and the context information and/or the intention information and.

The understanding degree to the new query by a machine is greater than the understanding degree to the original query by the machine.

According to another aspect of the present disclosure, a query rewriting apparatus is provided.

The apparatus includes an information extraction module and a query determination module.

The information extraction module is configured to, in response to a query rewriting request, extract at least one of context information of an original query and intention information of the original query.

The query determination module is configured to determine a new query based on a machine vocabulary collection and the at least one of the context information and the intention information.

The understanding degree to the new query by a machine is greater than the understanding degree to the original query by the machine.

According to another aspect of the present disclosure, an electronic device is provided. The device includes at least one processor and a memory communicatively connected to the at least one processor.

The memory stores instructions executable by the at least one processor to enable the at least one processor to perform the method of any embodiment of the present application.

According to another aspect of the present disclosure, a non-transitory computer-readable storage medium is provided. The storage medium stores computer instructions for causing a computer to perform the method of any embodiment of the present application.

Other aspects are apparent after reading and understanding the accompanying drawings and detailed description.

BRIEF DESCRIPTION OF DRAWINGS

The drawings are intended to provide a better understanding of the present solution and not to limit the present application.

DETAILED DESCRIPTION

Example embodiments of the present application, including details of embodiments of the present application, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present application. Similarly, description of well-known functions and structures is omitted hereinafter for clarity and conciseness.

Figure 1:
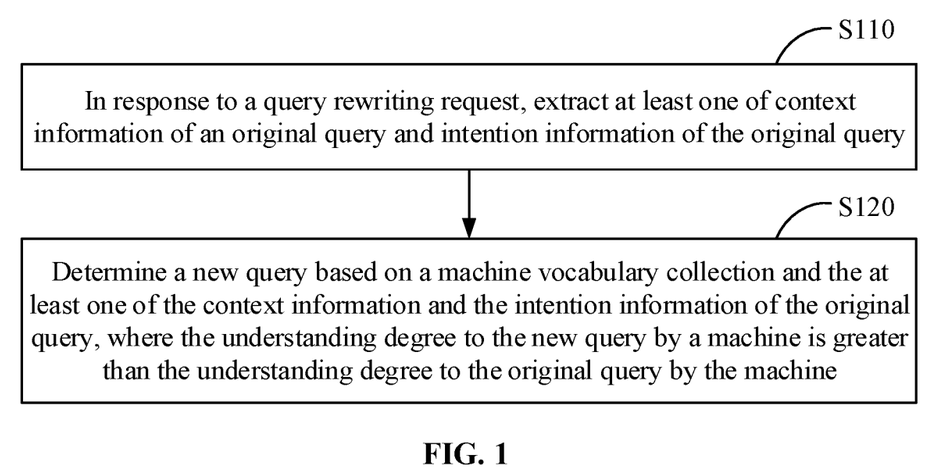
FIG. 1 is a flowchart of a query rewriting method according to an embodiment of the present application.

FIG. 1 is a flowchart of a query rewriting method according to an embodiment of the present application. This embodiment is applicable to intelligent man-machine conversation. The method may be performed by a query rewriting apparatus. The apparatus may be implemented by software and/or hardware. Typically, the apparatus may be disposed in the preceding machine. Referring to FIG. 1, the query rewriting method of this embodiment of the present application includes the steps below.

In S110, in response to a query rewriting request, at least one of context information of an original query and intention information of the original query is extracted.

The query rewriting request is a request for triggering rewriting of a query.

The trigger event of the query rewriting request may be the event that a user inputs a query.

To improve the retrieval efficiency, the trigger event of the query rewriting request may be the event that a machine is detected to not understand a query input by a user.

The original query refers to retrieval text that is input by a user and is to be rewritten.

The context information of the original query refers to information describing the context of the original query.

The context may be understood as a language environment or a meaning.

In an embodiment, the context information of the original query is extracted in the following manner: First word relationship information between words in the original query is extracted and then used as the context information of the original query.

The first word relationship information refers to information describing the relationship between words in the original query.

In an embodiment, the first word relationship information of the original query may be determined based on a word vector of the original query by using bidirectional recurrent neural networks (BRNN) or a bidirectional long short-term memory.

The intention information of the original query refers to information describing the intention of the original query.

In S120, a new query is determined based on a machine vocabulary collection and at least one of the extracted context information and the extracted intention information of the original query.

The understanding degree to the new query by a machine is greater than the understanding degree to the original query by the machine.

The machine refers to a device that has an intelligent conversation with a person.

The machine may be, for example, an intelligent speaker or may be a cellphone equipped with a speech assistant.

The new query refers to a query rewritten from the original query and better understandable by a machine than the original query.

The understanding degree to the new query by the machine refers to the extent to which the machine understands the new query.

The understanding degree to the original query by the machine refers to the extent to which the machine understands the original query.

The machine vocabulary collection refers to a collection of words that a machine can understand.

In an embodiment, the new query is determined based on the machine vocabulary collection and at least one of the context information of the original query and the intention information of the original query in the manner below.

A target vocabulary is determined from the machine vocabulary collection based on at least one of the context information of the original query and the intention information of the original query.

The target vocabulary is organized according to grammar so that the new query is obtained.

The target vocabulary refers to a vocabulary selected from the machine vocabulary collection to describe at least one of the context information of the original query and the intention information of the original query.

In the solution of this embodiment of the present application, the new query understandable by a machine is determined based on the machine vocabulary collection and at least one of the context information and the intention information of the original query. In this manner, the retrieval efficiency and intelligentization of the machine are improved, and the user experience is further improved.

Moreover, the new query is determined based on the context information of the original query and the intention information of the original query so that the new query matches the original query in both the semantic dimension and the intention dimension and thus the accuracy of the new query is improved.

Figure 2:
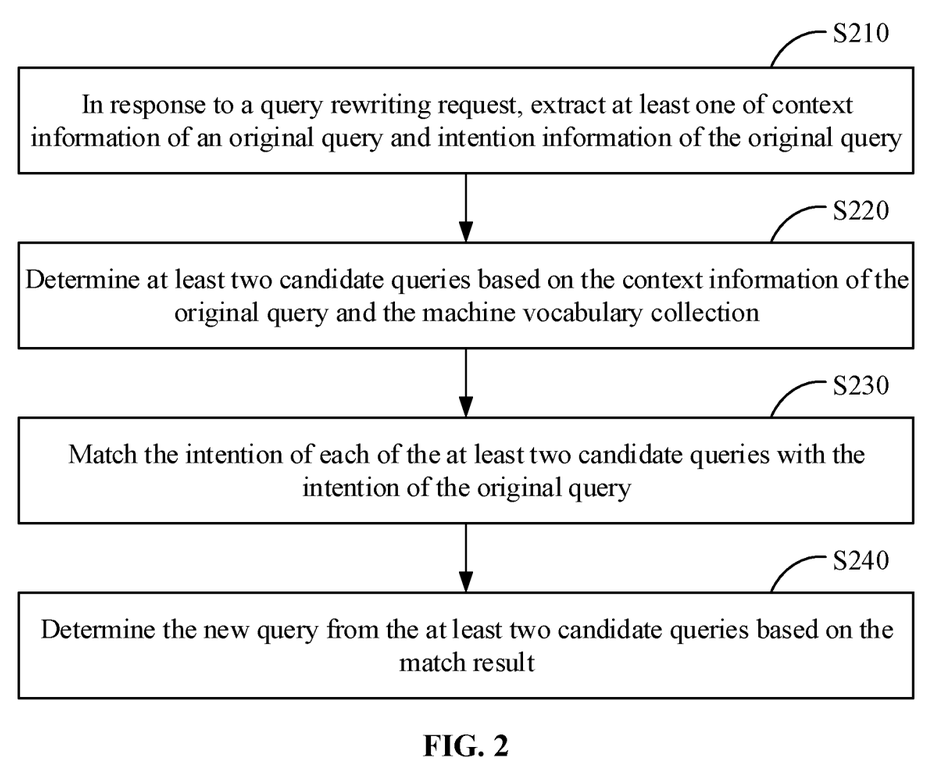
FIG. 2 is a flowchart of another query rewriting method according to an embodiment of the present application.

FIG. 2 is a flowchart of another query rewriting method according to an embodiment of the present application. This solution is an improvement on the step "a new query is determined based on a machine vocabulary collection and at least one of the context information and the intention information" of the previous embodiment. Referring to FIG. 2, the query rewriting method of this solution includes the steps below.

In S210, in response to a query rewriting request, at least one of context information of an original query and intention information of the original query is extracted.

In S220, at least two candidate queries are determined based on the context information of the original query and the machine vocabulary collection.

The candidate queries refer to possible new queries.

In S230, the intention of each of the at least two candidate queries is matched with the intention of the original query.

In S240, the new query is determined from the at least two candidate queries based on the match result.

In an embodiment, when the intention of a candidate query matches the intention of the original query, the candidate query is used as the new query.

In this solution, at least two candidate queries are determined based on the context information of the original query and the machine vocabulary collection; and then the new query is determined from the at least two candidate queries based on the match result between the intention of each of the at least two candidate queries and the intention of the original query. In this manner, the new query is determined based on the context information of the original query, the intention information of the original query and the machine vocabulary collection.

Figure 3:
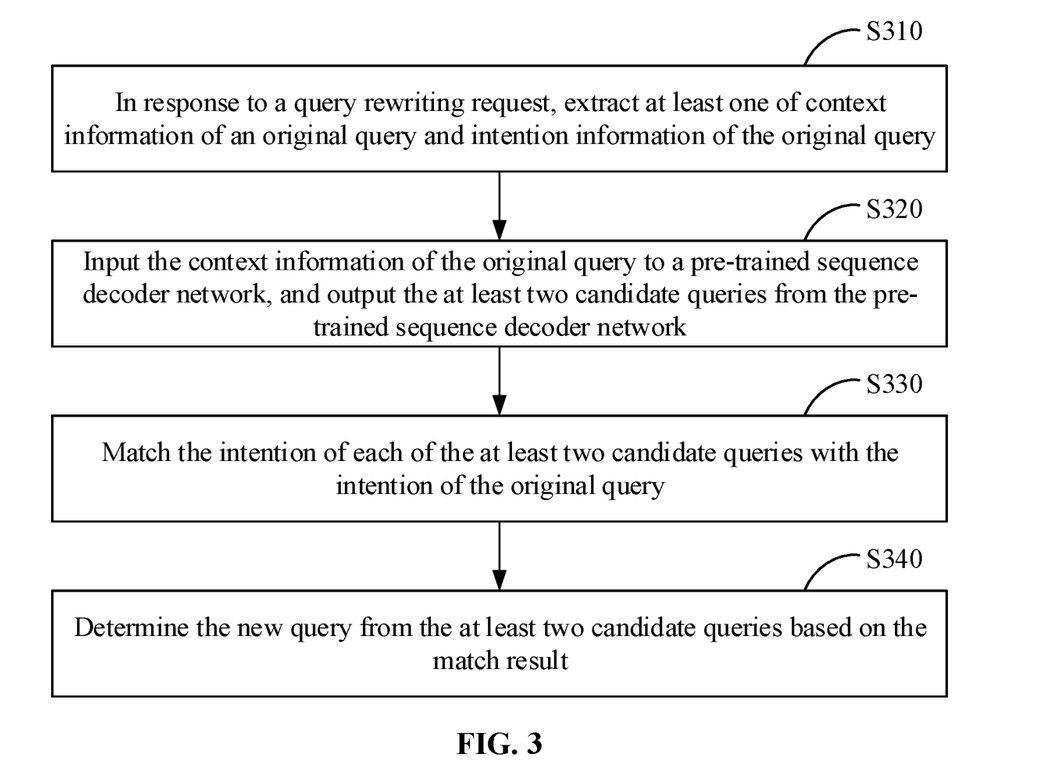
FIG. 3 is a flowchart of another query rewriting method according to an embodiment of the present application.

FIG. 3 is a flowchart of another query rewriting method according to an embodiment of the present application. This solution is an improvement on the step "at least two candidate queries are determined based on the context information of the original query and the machine vocabulary collection" of the previous solution. Referring to FIG. 3, the query rewriting method of this solution includes the steps below.

In S310, in response to a query rewriting request, at least one of context information of an original query and intention information of the original query is extracted.

In S320, the context information of the original query is input to a pre-trained sequence decoder network, and the at least two candidate queries are output from the pre-trained sequence decoder network.

The sequence decoder network learns the machine vocabulary collection by pre-training.

In an embodiment, the sequence decoder network is the network layer of the decoder part in a sequence-to-sequence model framework.

In S330, the intention of each of the at least two candidate queries is matched with the intention of the original query.

In an embodiment, the intention of each of the at least two candidate queries is matched with the intention of the original query in the manner below.

The intention of each of the at least two candidate queries is matched with the intention of the original query.

Alternatively, the intention of part of the at least two candidate queries is matched with the intention of the original query.

In S340, the new query is determined from the at least two candidate queries based on the match result.

In this solution, the semantic vector of the original query is input to the pre-trained sequence conversion network, and at least two candidate queries are output from the pre-trained sequence conversion network. The sequence conversion network learns the machine vocabulary collection by pre-training. The model learns the relationship between the original query and the candidate queries more accurately; therefore, with this solution, the accuracy of the candidate queries is improved.

Figure 4:
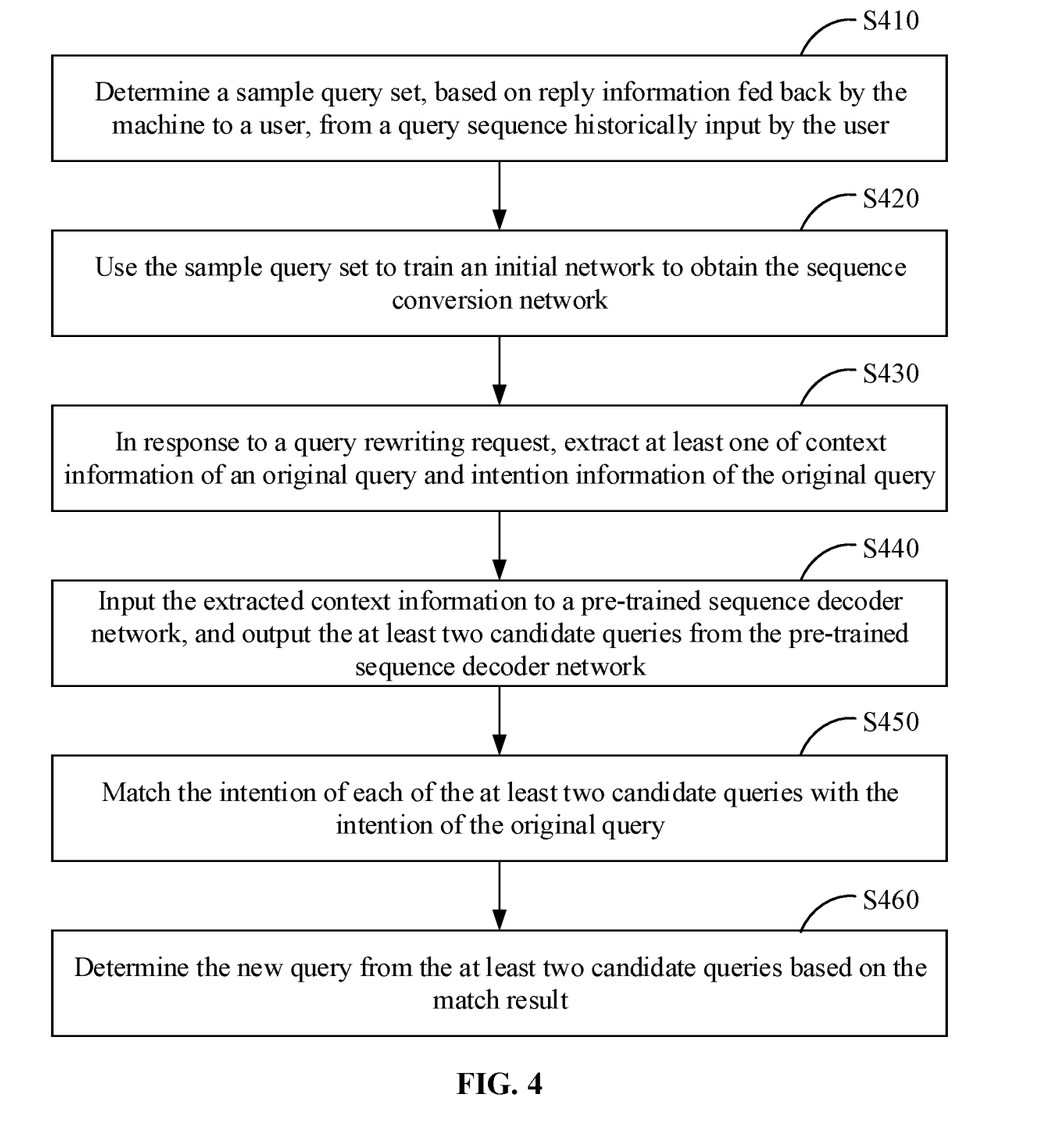
FIG. 4 is a flowchart of another query rewriting method according to an embodiment of the present application.

FIG. 4 is a flowchart of another query rewriting method according to an embodiment of the present application. This solution is an extension of the previous solution. Referring to FIG. 4, the query rewriting method of this solution includes the steps below.

In S410, a sample query set is determined, based on reply information fed back by the machine to a user, from a query sequence historically input by the user.

The sample query set includes at least one first query and at least one second query. The understanding degree to the at least one first query by the machine is greater than a first understanding degree threshold. The understanding degree to the at least one second query by the machine is less than a second understanding degree threshold. A semantic similarity between the at least one first query and the at least one second query is greater than a set similarity threshold.

The sample query set is sample data used for training of a sequence decoder network.

A first query refers to a query that a machine can understand.

A second query refers to a query that a machine cannot understand.

The first understanding degree threshold refers to, in a case where a query can be understood by a machine, the minimum value of the degree of understanding associated with the query.

The second understanding degree threshold refers to, in a case where a query cannot be understood by a machine, the maximum value of the degree of understanding associated with the query.

The reply information refers to information with which a machine replies to a user based on a query input by the user.

In an embodiment, the reply information may be the content of a reply or may be the degree of confidence of a reply.

The query sequence is multiple queries arranged by input time.

In an embodiment, the step in which the sample query set is determined, based on the reply information fed back by the machine to the user, from the query sequence historically input by the user is performed in the manner below.

The at least one first query that occurs consecutively is determined from the query sequence historically input by the user and based on the reply information fed back by the machine to the user.

The at least one second query that occurs consecutively to the at least one first query and after the at least one first query is detected.

The sample query set is determined based on the at least one first query and the at least one second query.

In an embodiment, the step in which the at least one first query that occurs consecutively is determined from the query sequence historically input by the user and based on the reply information fed back by the machine to the user is performed in the manner below.

The content of a reply associated with a query in the query sequence and fed back to the user by the machine is determined.

If the content of the reply is "not understand", this query is used as a first query.

Otherwise, the degree of confidence of the reply is determined based on the content of the reply.

If the determined degree of confidence is less than a set confidence threshold, this query is used as a first query.

The at least one first query that occurs consecutively is extracted from the query sequence.

In S420, the sample query set is used to train an initial network so that the sequence decoder network is obtained.

In S430, in response to a query rewriting request, at least one of context information of an original query and intention information of the original query is extracted.

In S440, the extracted context information is input to a pre-trained sequence decoder network, and the at least two candidate queries are output from the pre-trained sequence decoder network.

The sequence decoder network learns the machine vocabulary collection by pre-training.

In S450, the intention of each of the at least two candidate queries is matched with the intention of the original query.

In S460, the new query is determined from the at least two candidate queries based on the match result.

In an embodiment, S410 and S420 may be performed by the same subject as or a different subject from S430 to S450.

In this solution, the sample query set is determined, based on the reply information fed back by the machine to the user, from the query sequence historically input by the user. In this manner, the sample query set is automatically determined.

To further improve the accuracy of the sample query set, after the sample query set is determined, based on the reply information fed back by the machine to the user, from the query sequence historically input by the user, this solution further includes the steps below.

When the sample query set includes at least two first queries, a similarity between each first query in the sample query set and the at least one second query in the sample query set is calculated.

The first queries in the sample query set are filtered based on the calculated similarity.

Based on this technical feature, in this solution, the first queries in the sample query set are filtered based on the similarity between each first query in the sample query set and the at least one second query in the sample query set. In this manner, erroneous queries in the sample query set are filtered out.

Figure 5:
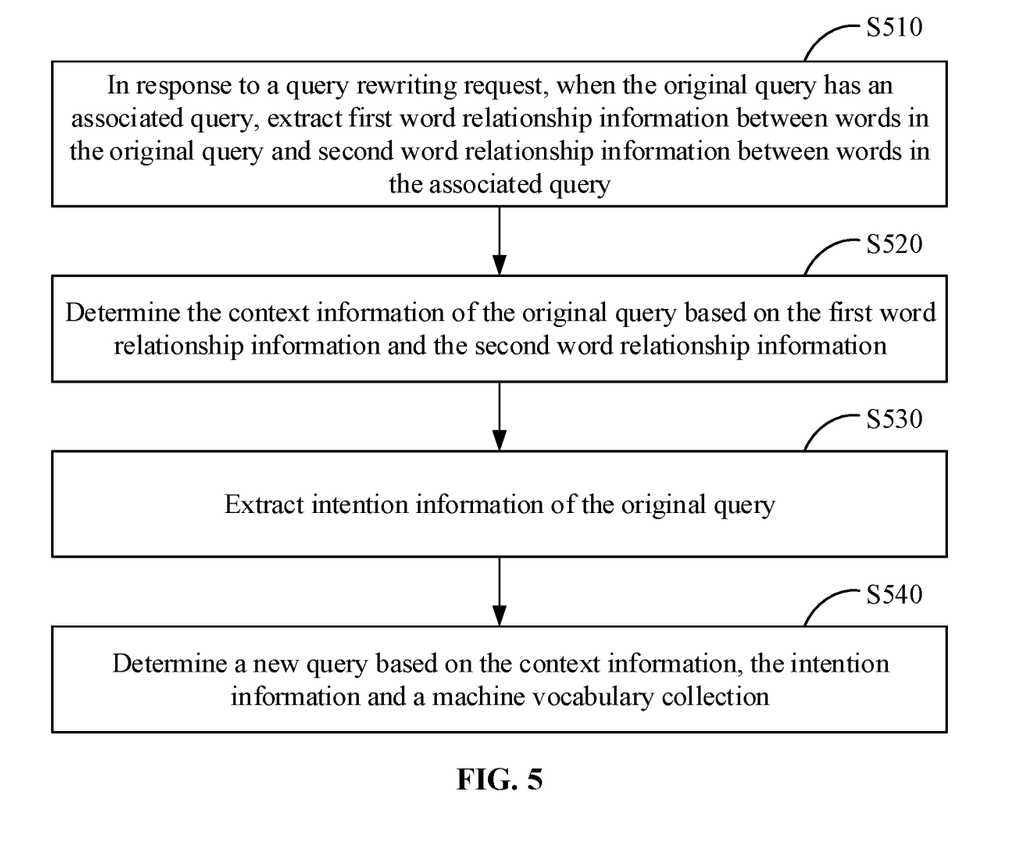
FIG. 5 is a flowchart of another query rewriting method according to an embodiment of the present application.

FIG. 5 is a flowchart of another query rewriting method according to an embodiment of the present application. This solution is an improvement on the step "context information of an original query is extracted" of the previous solution. Referring to FIG. 5, the query rewriting method of this solution includes the steps below.

In S510, in response to a query rewriting request, when the original query has an associated query, first word relationship information between words in the original query and second word relationship information between words in the associated query are extracted.

The associated query refers to a query semantically associated with the original query.

In an embodiment, the associated query is determined in the manner below.

The associated query of the original query is determined from other queries based on time intervals at which the original query and other queries are input.

Other queries refer to queries entered by a user, excluding the original query.

The second word relationship information is information describing an inter-word relationship in the associated query.

In S520, the context information of the original query is determined based on the extracted first word relationship information and the extracted second word relationship information.

In an embodiment, the context information of the original query is determined based on the extracted first word relationship information and the extracted second word relationship information in the manner below.

Based on the network layer of the encoder part in a sequence-to-sequence model framework, the context information of the original query is determined based on the extracted first word relationship information and the extracted second word relationship information.

In S530, intention information of the original query is extracted.

In S540, a new query is determined based on the context information, the intention information and a machine vocabulary collection.

The understanding degree to the new query by a machine is greater than the understanding degree to the original query by the machine.

In this solution, the semantic relationship between the original query and the associated query is extracted and used as the context information of the original query. In this manner, the accuracy of the context information is further improved.

Further, after the new query is determined based on the machine vocabulary collection and at least one of semantic information of the original query and the intention information of the original query, this solution further includes the steps below.

The new query is fed back to a user in a form of a text prompt or two rounds of inquiries.

After receiving a positive answer from the user, retrieval is conducted according to the new query and a retrieval result is fed back to the user.

Figure 6:
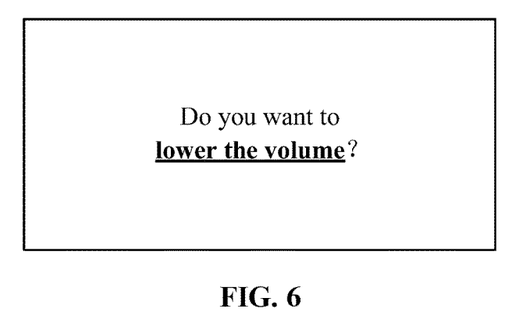
FIG. 6 is a diagram of a feedback effect of a new query according to an embodiment of the present application.
Figure 7:
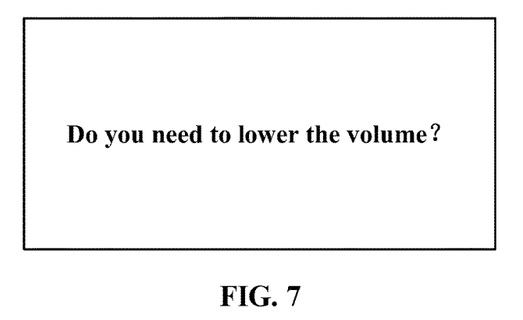
FIG. 7 is a diagram of another feedback effect of a new query according to an embodiment of the present application.

Exemplarily, when the determined new query is to lower the volume, referring to FIG. 6, the new query is presented to the user in the form of a text prompt or referring to FIG. 7, the determined new query is fed back to the user in the form of two rounds of inquiries.

Based on this technical feature, in this solution, the new query is fed back to the user in the form of a text prompt or two rounds of inquiries; and after receiving the positive answer from the user, the retrieval is conducted according to the new query and the retrieval result is fed back to the user. In this manner, the flexibility of an intelligent conversation is improved.

This solution is an optional solution provided based on the previous solution. The query rewriting method provided in this solution includes the step below.

When the machine does not understand the original query input by the user, the original query is input to a pre-trained query rewriting model, and then a new query that the machine can understand is output.

Figure 8:
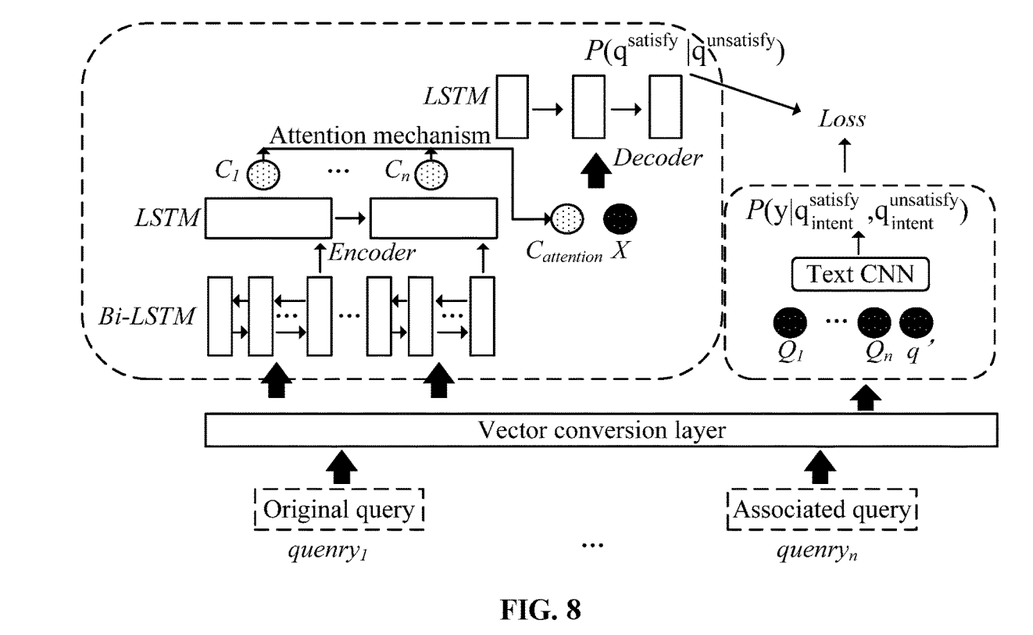
FIG. 8 is a diagram illustrating the structure of a query rewriting model according to an embodiment of the present application.

Referring to FIG. 8, the query rewriting model includes a sequence conversion network and an intention consistency prediction network. The sequence conversion network is a sequence-to-sequence model. The sequence-to-sequence model is implemented by an encoder-decoder framework added with an attention mechanism. The encoder part and the decoder part of the encoder-decoder framework are both an LSTM network. The sequence encoder network in the sequence conversion network corresponds to the encoder part of the encoder-decoder frame. The sequence decoder network in the sequence conversion network corresponds to the decoder part of the encoder-decoder frame. The intention consistency prediction network uses the TextCNN model. TextCNN is an algorithm for classifying text by using a convolutional neural network.

The training sample of the query rewriting model is determined in the manner below.

A sample data set is determined, based on feedback information fed back by a machine to a user based on a query, from a query sequence historically input by the user.

The sample query set includes at least one first query and at least one second query. The understanding degree to the at least one first query by the machine is greater than a first understanding degree threshold. The understanding degree to the at least one second query by the machine is less than a second understanding degree threshold. A semantic similarity between the at least one first query and the at least one second query is greater than a set similarity threshold.

With continued reference to FIG. 8, assuming that the original query has at least one associated query, the training logic of the query rewriting model may be described as below.

Vector conversion of the original query as a first query and at least one associated query is performed based on a vector conversion layer so that a vector representation corresponding to each query is obtained.

The obtained vector representation corresponding to each query is input to an initial conversion network and an initial prediction network separately.

The execution logic in the initial conversion network may be described as below.

Word relationship information between words in each query is extracted based on a Bi-LSTM network and the vector representation corresponding to each query.

The context vector of each query is determined to be $c_1$ to $c_n$ based on the LSTM network of the encoder part and the word relationship information between words in each query.

The relevance between the word vector x of a word in a second query and the context vector of each query is calculated by using the attention mechanism and denoted by a. Then context vectors of these queries are added up according to relevance weights to form an overall context vector denoted by $c_{attention}$.

The word vector x and $c_{attention}$ are spliced and input to the LSTM network of the decoder part so that a candidate word denoted by x' is generated.

The word in the second query is fitted by using the generated x' and a maximum likelihood estimation is performed so that the preceding query conversion network is obtained.

The execution logic of the initial prediction network may be described as below.

A pooling operation of the word vectors of the first queries is performed so that pooling vectors of the first queries are obtained.

The pooling vectors are spliced according to an input time sequence to form a matrix Q.

A generated candidate query q' also experiences the preceding operation and then is spliced to the last row of the matrix Q so that the final input matrix is obtained.

The final input matrix is input to the TextCNN model, and the intention information of the candidate query is output.

The intention information of the first query and the intention information of the candidate query are fitted so that the preceding intention consistency prediction network is obtained.

The preceding model training process may also be described using the formula below.

$$\mathrm{argmax}_{q^{satisfy} \in Q^{satisfy}} \mathrm{Loss} = w_1 \times P(q^{satisfy}|q^{unsatisfy}) + w_2 \times P(y|q_{intent}^{satisfy}, q_{intent}^{unsatisfy})$$

$q_{satisfy}$ corresponds to the second query. $q^{unsatisfy}$ corresponds to the first query. $Q^{satisfy}$ corresponds to a second query set. $q_{intent}^{satisfy}$ corresponds to the intention information of the second query. $q_{intent}^{unsatisfy}$ corresponds to the intention information of the first query. y is a consistency identifier. For example, when equal to 1, y indicates that $q_{intent}^{unsatisfy}$ is consistent with $q_{intent}^{satisfy}$; when equal to 0, y indicates that $q_{intent}^{unsatisfy}$ is inconsistent with $q_{intent}^{satisfy}$. $\mathrm{argmax}_{q^{satisfy} \in Q^{satisfy}}$ Loss refers to the maximum likelihood function when the input is $q^{unsatisfy}$ and the output is $q^{satisfy}$. $P(q^{satisfy}|q^{unsatisfy})$ corresponds to a conditional probability when the input is $q^{unsatisfy}$ and the output is $q^{satisfy}$. $P(y|q_{intent}^{satisfy}, q_{intent}^{unsatisfy})$ corresponds to the probability of consistency between $q_{intent}^{unsatisfy}$ and $q_{intent}^{satisfy}$. $w_1$ and $w_2$ each denotes a weight.

Figure 9:
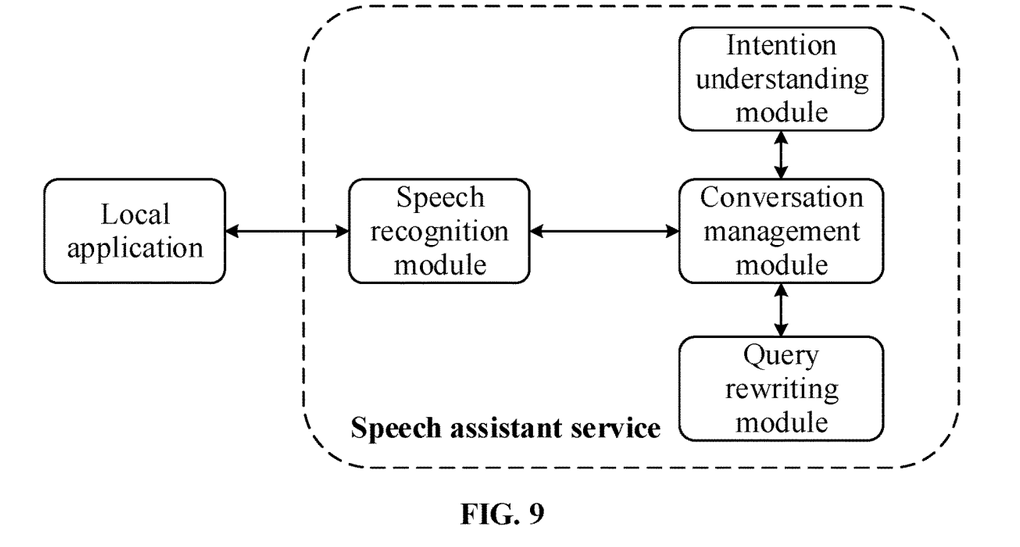
FIG. 9 is a block diagram of a system applied to a map speech assistant according to an embodiment of the present application.

Typically, this solution is applicable to a map speech assistant. The overall framework is shown in FIG. 9.

With this solution, a query is automatically rewritten by using the query rewriting model. With this model, labor consumption is greatly reduced since it is not needed to manually design rules and configure replies accordingly.

A reply is flexibly generated based on a query input by the user so that the perceivable degree of intelligence is increased and the user experience is improved.

A similar query is determined based on the text content and intention of a query so that the user can acquire desired information more quickly and accurately and gain a better interaction experience.

Figure 10:
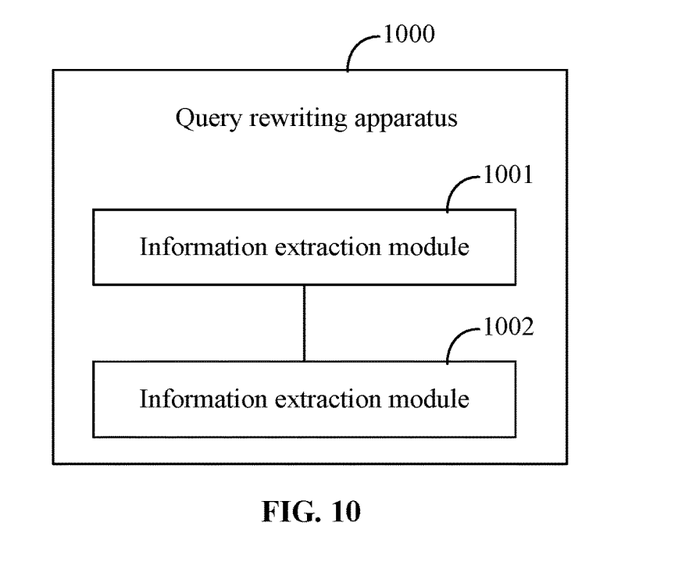
FIG. 10 is a diagram illustrating the structure of a query rewriting apparatus according to an embodiment of the present application.

FIG. 10 is a diagram illustrating the structure of a query rewriting apparatus according to an embodiment of the present application. Referring to FIG. 10, the query rewriting apparatus 1000 of this embodiment of the present application includes an information extraction module 1001 and a query determination module 1002.

The information extraction module 1001 is configured to, in response to a query rewriting request, extract at least one of context information of an original query and intention information of the original query.

The query determination module 1002 is configured to determine a new query based on a machine vocabulary collection and at least one of the context information and the intention information.

The understanding degree to the new query by a machine is greater than the understanding degree to the original query by the machine.

In the solution of this embodiment of the present application, the new query is determined based on the machine vocabulary collection and at least one of the context information and the intention information of the original query. In this manner, the retrieval efficiency and intelligentization of the machine are improved, and the user experience is further improved.

Moreover, the new query is determined based on the context information of the original query and the intention information of the original query so that the new query matches the original query in both the semantic dimension and the intention dimension and thus the accuracy of the new query is improved.

Further, the query determination module includes a candidate query determination unit, an intention matching unit and a new query determination unit.

The candidate query determination unit is configured to determine at least two candidate queries based on the context information and the machine vocabulary collection.

The intention matching unit is configured to match the intention of each of the at least two candidate queries with the intention of the original query.

The new query determination unit is configured to determine the new query from the at least two candidate queries based on the match result.

Further, the candidate query determination unit includes a query determination subunit.

The query determination subunit is configured to input the context information to a pre-trained sequence decoder network and output the at least two candidate queries from the pre-trained sequence decoder network.

The sequence decoder network learns the machine vocabulary collection by pre-training.

The apparatus further includes a sample determination module and a model training module.

The sample determination module is configured to, before a semantic vector of the original query is input to a pre-trained sequence conversion network, determine, based on reply information fed back by the machine to a user, a sample query set from a query sequence historically input by the user.

The sample query set includes at least one first query and at least one second query. The understanding degree to the at least one first query by the machine is greater than a first understanding degree threshold. The understanding degree to the at least one second query by the machine is less than a second understanding degree threshold. A semantic similarity between the at least one first query and the at least one second query is greater than a set similarity threshold.

The model training module is configured to use the sample query set to train an initial network to obtain the sequence conversion network.

Further, the sample determination module includes a first query determination unit, a second query determination unit and a sample determination unit.

The first query determination unit is configured to determine, from the query sequence historically input by the user and based on the reply information fed back by the machine to the user, the at least one first query that occurs consecutively.

The second query determination unit is configured to detect the at least one second query that occurs consecutively to the at least one first query and after the at least one first query.

The sample determination unit is configured to determine the sample query set based on the at least one first query and the at least one second query.

The apparatus further includes a similarity calculation module and a query filtering module.

The similarity calculation module is configured to calculate a similarity between each first query in the sample query set and the at least one second query in the sample query set after the sample query set is determined, based on the reply information fed back by the machine to the user, from the query sequence historically input by the user and when the sample query set includes at least two first queries.

The query filtering module is configured to filter on the at least two first queries in the sample query set based on the calculated similarity.

Further, when the original query has an associated query, the information extraction module includes an information extraction unit and an information determination unit.

The information extraction unit is configured to extract first word relationship information between words in the original query and second word relationship information between words in the associated query.

The information determination unit is configured to determine the context information of the original query based on the first word relationship information and the second word relationship information.

The apparatus further includes a query feedback module and a retrieval module.

The query feedback module is configured to, after the new query is determined based on the machine vocabulary collection and at least one of semantic information of the original query and/or the intention information of the original query, feed back the new query to a user in the form of a text prompt or two rounds of inquiries.

The retrieval module is configured to, after receiving a positive answer from the user, conduct retrieval according to the new query and feed back the retrieval result to the user.

According to an embodiment of the present application, the present application further provides an electronic device and a readable storage medium.

Figure 11:
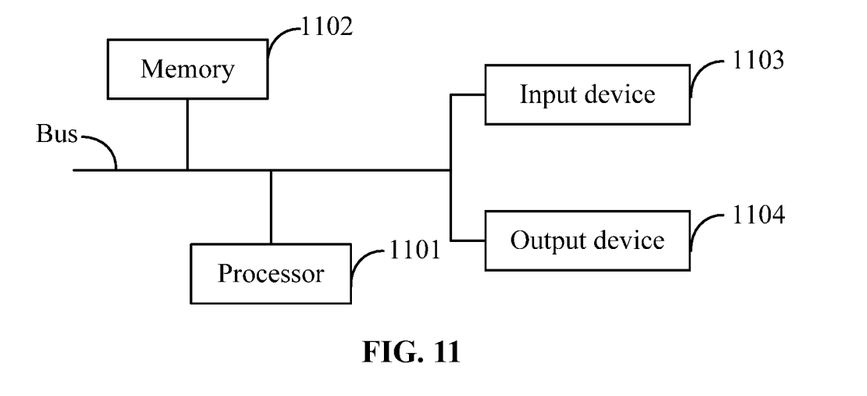
FIG. 11 is a block diagram of an electronic device for a query rewriting method according to an embodiment of the present application.

FIG. 11 is a block diagram of an electronic device for a query rewriting method according to an embodiment of the present application. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present application as described and/or claimed herein.

As shown in FIG. 11, the electronic device includes one or more processors 1101, a memory 1102, and interfaces for connecting components, including a high-speed interface and a low-speed interface. The components are interconnected to each other by different buses and may be mounted on a common mainboard or in other manners as desired. The processor may process instructions executed in the electronic device, including instructions stored in or on the memory to make graphic information of a GUI displayed on an external input/output device (for example, a display device coupled to an interface). In other embodiments, if required, multiple processors and/or multiple buses may be used with multiple memories. Similarly, multiple electronic devices may be connected, each providing some necessary operations (for example, a server array, a set of blade servers or a multi-processor system). FIG. 11 shows one processor 1101 by way of example.

The memory 1102 is the non-transitory computer-readable storage medium provided in the present application. The memory stores instructions executable by at least one processor to cause the at least one processor to perform the query rewriting method provided in the present application. The non-transitory computer-readable storage medium of the present application stores computer instructions for causing a computer to perform the query rewriting method provided in the present application.

The memory 1102 as a non-transitory computer-readable storage medium is configured to store non-transitory software programs, non-transitory computer-executable programs, and modules, for example, program instructions/modules (for example, the information extraction module 1001 and the query determination module 1002 shown in FIG. 10) corresponding to the query rewriting method according to any embodiment of the present application. The processor 1101 executes non-transitory software programs, instructions and modules stored in the memory 1102 to execute the various function applications and data processing of a server, that is, implement the query rewriting method provided in any preceding method embodiment.

The memory 1102 may include a program storage region and a data storage region. The program storage region may store an operating system and an application program required by at least one function. The data storage region may store data created based on the use of the electronic device for performing the query rewriting method. Additionally, the memory 1102 may include a high-speed random-access memory and a non-transient memory, for example, at least one disk memory, a flash memory or another non-transient solid-state memory. In some embodiments, the memory 1102 includes memories disposed remote from the processor 1101, and these remote memories may be connected, through a network, to the electronic device for the query rewriting method. Examples of the preceding network include, but are not limited to, the Internet, an intranet, a local area network, a mobile communication network and a combination thereof.

The electronic device for the query rewriting method may further include an input device 1103 and an output device 1104. The processor 1101, the memory 1102, the input device 1103 and the output device 1104 may be connected by a bus or in other manners. FIG. 11 uses connection by a bus as an example.

The input device 1103 can receive input number or character information and generate key signal input related to user settings and function control of the electronic device for query rewriting. The input device 1103 may be, for example, a touchscreen, a keypad, a mouse, a trackpad, a touchpad, a pointing stick, one or more mouse buttons, a trackball or a joystick. The output device 1104 may be, for example, a display device, an auxiliary lighting device (for example, an LED) or a haptic feedback device (for example, a vibration motor). The display device may include, but is not limited to, a liquid-crystal display (LCD), a light-emitting diode (LED) display or a plasma display. In some embodiments, the display device may be a touchscreen.

The various embodiments of the systems and techniques described herein may be implemented in digital electronic circuitry, integrated circuitry, an application-specific integrated circuit (ASIC), computer hardware, firmware, software and/or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting the data and instructions to the memory system, the at least one input device and the at least one output device.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" or "computer-readable medium" refers to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), the Internet and a blockchain network.

The computing system may include clients and servers. A client and a server are generally remote from each other and typically interact through a communication network. The relationship between the client and the server arises by virtue of computer programs running on the respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

With the technology of the present application, the retrieval efficiency, retrieval accuracy and intelligentization of the machine are improved. It is to be understood that various forms of the preceding flows may be used, with steps reordered, added or removed. For example, the steps described in the present application may be executed in parallel, in sequence or in a different order as long as the desired result of the technical solution disclosed in the present application is achieved. The execution sequence of these steps is not limited herein.

The scope of the present application is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present application are within the scope of the present application.

What is claimed is:

1. A query rewriting method, comprising:
    in response to a query rewriting request, extracting context information of an original query and intent information of the original query; and
    determining a new query based on a machine vocabulary collection, and the at least one of the context information and the intent information,
    wherein the new query is better understandable by an intelligent device than the original query;
    wherein determining the new query based on the machine vocabulary collection, the context information and the intent information comprises:
    determining, according to the context information, at least two candidate queries by utilizing a pre-trained sequence decoder network, wherein the sequence decoder network learns the machine vocabulary collection by pre-training;
    determining, according to the intent information, an intent similarity between the original query and each of the at least two candidate queries by utilizing a pre-trained intent consistency prediction network; and
    determining the new query from the at least two candidate queries based on the intent similarity;
    wherein determining, according to the context information, the at least two candidate queries by utilizing the pre-trained sequence decoder network comprises:
    inputting the context information to the pre-trained sequence decoder network and outputting the at least two candidate queries from the pre-trained sequence decoder network;
    wherein before inputting the context information to the pre-trained sequence decoder network, the method further comprises:
    determining, based on reply information fed back by the intelligent device to a user-side, a sample query set from a query sequence historically input by the user-side to train the sequence decoder network,
    wherein the sample query set comprises at least one first query and at least one second query, an understanding degree to the at least one first query by the intelligent device is greater than a first understanding degree threshold, an understanding degree to the at least one second query by the intelligent device is less than a second understanding degree threshold, and a semantic similarity between the at least one first query and the at least one second query is greater than a set similarity threshold.

2. The method of claim 1, wherein determining, based on the reply information fed back by the intelligent device to the user-side, the sample query set from the query sequence historically input by the user-side comprises:
  determining, based on the reply information fed back by the intelligent device to the user-side, the at least one first query that occurs consecutively from the query sequence historically input by the user-side;
  detecting the at least one second query that occurs consecutively to the at least one first query and after the at least one first query; and
  determining the sample query set based on the at least one first query and the at least one second query.

3. The method of claim 1, after determining, based on the reply information fed back by the intelligent device to the user-side, the sample query set from the query sequence historically input by the user-side, the method further comprising:
  when the sample query set comprises at least two first queries, calculating a similarity between each of the at least two first queries in the sample query set and the at least one second query in the sample query set; and
  filtering on the at least two first queries in the sample query set based on the calculated similarity.

4. The method of claim 1, wherein when the original query has an associated query, the context information of the original query is extracted in the following manner:
  extracting first word relationship information between words in the original query and second word relationship information between words in the associated query; and
  determining the context information of the original query based on the first word relationship information and the second word relationship information.

5. The method of claim 1, after determining the new query based on the machine vocabulary collection, the context information of the original query and the intent information of the original query, the method further comprising:
  feeding back the new query to a user-side in a form of a text prompt or two rounds of inquiries; and
  after receiving a positive answer from the user-side, conducting retrieval according to the new query and feeding back a retrieval result to the user-side.

6. An electronic device, comprising:
  at least one processor; and
  a memory communicatively connected to the at least one processor, wherein
  the memory stores instructions executable by the at least one processor, and the processor is configured to:
  in response to a query rewriting request, extract context information of an original query and intent information of the original query; and
  determine a new query based on a machine vocabulary collection, the context information and the intent information,
  wherein the new query is better understandable by an intelligent device than the original query;
  wherein the processor is configured to determine the new query based on the machine vocabulary collection, the context information and the intent information in the following manner:
  determining, according to the context information, at least two candidate queries by utilizing a pre-trained sequence decoder network, wherein the sequence decoder network learns the machine vocabulary collection by pre-training;
  determining, according to the intent information, an intent similarity between the original query and each of the at least two candidate queries by utilizing a pre-trained intent consistency prediction network; and
  determining the new query from the at least two candidate queries based on the intent similarity;
  wherein the processor is configured to determine, according to the context information, the at least two candidate queries by utilizing the pre-trained sequence decoder network in the following manner:
  inputting the context information to the pre-trained sequence decoder network and outputting the at least two candidate queries from the pre-trained sequence decoder network;
  wherein before inputting the context information to the pre-trained sequence decoder network, the processor is configured to further implement:
  determining, based on reply information fed back by the intelligent device to a user-side, a sample query set from a query sequence historically input by the user-side to train the sequence decoder network,
  wherein the sample query set comprises at least one first query and at least one second query, an understanding degree to the at least one first query by the intelligent device is greater than a first understanding degree threshold, an understanding degree to the at least one second query by the intelligent device is less than a second understanding degree threshold, and a semantic similarity between the at least one first query and the at least one second query is greater than a set similarity threshold.

7. The electronic device of claim 6, wherein the processor is configured to determine, based on the reply information fed back by the intelligent device to the user-side, the sample query set from the query sequence historically input by the user-side in the following manner:
  determining, based on the reply information fed back by the intelligent device to the user-side, the at least one first query that occurs consecutively from the query sequence historically input by the user-side;
  detecting the at least one second query that occurs consecutively to the at least one first query and after the at least one first query; and
  determining the sample query set based on the at least one first query and the at least one second query.

8. The electronic device of claim 6, wherein the processor is configured to:
  after determining, based on the reply information fed back by the intelligent device to the user-side, the sample query set from the query sequence historically input by the user-side,
  when the sample query set comprises at least two first queries, calculate a similarity between each of the at least two first queries in the sample query set and the at least one second query in the sample query set; and
  filter on the at least two first queries in the sample query set based on the calculated similarity.

9. The electronic device of claim 6, wherein when the original query has an associated query, the context information of the original query is extracted in the following manner:
  extracting first word relationship information between words in the original query and second word relationship information between words in the associated query; and determining the context information of the original query based on the first word relationship information and the second word relationship information.

10. The electronic device of claim 6, wherein after determining the new query based on the machine vocabulary collection, the context information of the original query and the intent information of the original query, the processor is configured to further perform:
feeding back the new query to a user-side in a form of a text prompt or two rounds of inquiries; and
after receiving a positive answer from the user-side, conducting retrieval according to the new query and feeding back a retrieval result to the user-side.

11. A non-transitory computer-readable storage medium storing computer instructions for causing a computer to perform:
in response to a query rewriting request, extracting context information of an original query and intent information of the original query; and
determining a new query based on a machine vocabulary collection, the context information and the intent information,
wherein the new query is better understandable by an intelligent device than the original query;
wherein the computer is caused to perform determining the new query based on the machine vocabulary collection, the context information and the intent information by:
determining, according to the context information, at least two candidate queries by utilizing a pre-trained sequence decoder network, wherein the sequence decoder network learns the machine vocabulary collection by pre-training;
determining, according to the intent information, an intent similarity between the original query and each of the at least two candidate queries by utilizing a pre-trained intent consistency prediction network; and
determining the new query from the at least two candidate queries based on the intent similarity;
wherein the computer is caused to perform determining, according to the context information, the at least two candidate queries by utilizing the pre-trained sequence decoder network by:
inputting the context information to the pre-trained sequence decoder network and outputting the at least two candidate queries from the pre-trained sequence decoder network;
wherein before inputting the context information to the pre-trained sequence decoder network, the computer instructions cause the computer to further implement:
determining, based on reply information fed back by the intelligent device to a user-side, a sample query set from a query sequence historically input by the user-side to train the sequence decoder network,
wherein the sample query set comprises at least one first query and at least one second query, an understanding degree to the at least one first query by the intelligent device is greater than a first understanding degree threshold, an understanding degree to the at least one second query by the intelligent device is less than a second understanding degree threshold, and a semantic similarity between the at least one first query and the at least one second query is greater than a set similarity threshold.

12. The non-transitory computer-readable storage medium of claim 11, wherein the computer is caused to perform determining, based on the reply information fed back by the intelligent device to the user-side, the sample query set from the query sequence historically input by the user-side by:
determining, based on the reply information fed back by the intelligent device to the user-side, the at least one first query that occurs consecutively from the query sequence historically input by the user-side;
detecting the at least one second query that occurs consecutively to the at least one first query and after the at least one first query; and
determining the sample query set based on the at least one first query and the at least one second query.

13. The non-transitory computer-readable storage medium of claim 11, wherein after determining, based on the reply information fed back by the intelligent device to the user-side, the sample query set from the query sequence historically input by the user-side, the computer instructions cause the computer to perform:
when the sample query set comprises at least two first queries, calculating a similarity between each of the at least two first queries in the sample query set and the at least one second query in the sample query set; and
filtering on the at least two first queries in the sample query set based on the calculated similarity.

14. The non-transitory computer-readable storage medium claim 11, wherein when the original query has an associated query, the context information of the original query is extracted in the following manner:
extracting first word relationship information between words in the original query and second word relationship information between words in the associated query; and
determining the context information of the original query based on the first word relationship information and the second word relationship information.

15. The non-transitory computer-readable storage medium claim 11, wherein after determining the new query based on the machine vocabulary collection, the context information of the original query and the intent information of the original query, the processor is caused to further perform:
feeding back the new query to a user-side in a form of a text prompt or two rounds of inquiries; and
after receiving a positive answer from the user-side, conducting retrieval according to the new query and feeding back a retrieval result to the user-side.

* * * * *